US008099448B2

(12) United States Patent
Ahmed et al.

(10) Patent No.: US 8,099,448 B2
(45) Date of Patent: Jan. 17, 2012

(54) ARITHMETIC LOGIC AND SHIFTING DEVICE FOR USE IN A PROCESSOR

(75) Inventors: Muhammad Ahmed, Austin, TX (US); Ajay Anant Ingle, Austin, TX (US); Sujat Jamil, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1178 days.

(21) Appl. No.: 11/266,076

(22) Filed: Nov. 2, 2005

(65) Prior Publication Data

US 2007/0100923 A1    May 3, 2007

(51) Int. Cl.
G06F 7/00 (2006.01)
G06F 15/00 (2006.01)
G06F 7/38 (2006.01)
G06F 9/26 (2006.01)
G06F 9/34 (2006.01)

(52) U.S. Cl. ......... 708/209; 708/490; 711/212; 711/219

(58) Field of Classification Search .......... 711/200–201, 711/219–220; 712/41, 204, 300; 708/490
See application file for complete search history.

(56) References Cited

U.S. PATENT DOCUMENTS

| | | | | |
|---|---|---|---|---|
| 3,916,388 A | * | 10/1975 | Shimp et al. ................... | 711/201 |
| 4,654,781 A | * | 3/1987 | Schwartz et al. ............. | 711/219 |
| 4,959,779 A | * | 9/1990 | Weber et al. .................. | 711/201 |
| 5,450,607 A | * | 9/1995 | Kowalczyk et al. ............ | 712/41 |
| 5,499,380 A | * | 3/1996 | Iwata et al. .................... | 711/212 |
| 5,822,779 A | * | 10/1998 | Intrater et al. ................ | 711/168 |
| 5,907,694 A | * | 5/1999 | Suzuki et al. ................. | 712/210 |
| 5,922,066 A | * | 7/1999 | Cho et al. ...................... | 712/204 |
| 5,933,651 A | * | 8/1999 | Masuda et al. ................. | 712/42 |
| 6,061,779 A | * | 5/2000 | Garde ........................... | 712/204 |
| 6,476,634 B1 | | 11/2002 | Bilski | |
| 6,574,724 B1 | * | 6/2003 | Hoyle et al. .................. | 711/220 |
| 6,714,233 B2 | | 3/2004 | Chihara et al. | |
| 6,721,866 B2 | * | 4/2004 | Roussel et al. ............... | 711/201 |
| 6,785,887 B2 | | 8/2004 | Armstrong et al. | |
| 6,978,359 B2 | * | 12/2005 | Miyamori ..................... | 712/204 |

(Continued)

OTHER PUBLICATIONS

Yeung, N.; Zivkov, B.; Ezer, G., "Unified datapath: an innovative approach to the design of a low-cost, low-power, high-performance microprocessor," Compcon Spring '94, Digest of Papers., pp. 32-37, Feb. 28-Mar. 4, 1994.*

(Continued)

Primary Examiner — Lewis A Bullock, Jr.
Assistant Examiner — Matthew Sandifer
(74) Attorney, Agent, or Firm — Peter M. Kamarchik; Nicholas J. Pauley; Jonathan T. Velasco

(57) ABSTRACT

An arithmetic logic and shifting device is disclosed and includes an arithmetic logic unit that has a first input to receive a first operand from a first register port, a second input to receive a second operand from a second register port, and an output to selectively provide a memory address to a memory unit in a first mode of operation and to selectively provide an arithmetic output in a second mode of operation. Further, the arithmetic logic and shifting device includes a programmable shifter device that has a first input to receive data from the memory unit, a second input to receive the arithmetic output, a third input to receive an operation code of a computer execution instruction, and a shifted output to provide shifted data.

18 Claims, 8 Drawing Sheets

U.S. PATENT DOCUMENTS

| | | | | |
|---|---|---|---|---|
| 7,102,069 | B2* | 9/2006 | Georges | 84/609 |
| 7,328,332 | B2* | 2/2008 | Tran | 712/238 |
| 2006/0200647 | A1* | 9/2006 | Cohen | 712/34 |

OTHER PUBLICATIONS

MIPS Technologies, "R4300i Product Information", R4300 Data Sheet, Rev 0.3, Apr. 1997.*

"TMS320C25 Digital Signal Processor" Microprocessors and Microsystems, IPC Business Press LTD. London, GB, vol. 12, No. 9, Nov. 1, 1998, pp. 505-512, XP000051571, ISSN: 0141-933.

Kloker K L: "The Motorola DSP56000 Digital Signal Processor" IEEE Micro, IEEE Service Center, Los Alamitos, CA, US, vol. 6, No. 6, Dec. 1, 1986, pp. 29-48, XP000211994, ISSN: 0272-1732.

Fine B et al: "Consideratins for Selecting a DSP Processor (ADSP-2101 VS. TMS320C50)" Microprocessors and Microsystems, IPC Business Press Ltd. London, GB, vol. 18, No. 6, Jul. 1, 1994, pp. 351-362, XP000460483, ISSN: 0141-9331.

International Search Report-PCT/US06/060500, International Search Authority—European Patent Office—Jul. 20, 2007.

Written—PCT/US06/060500, International Search Authority—European Patent Office—Jul. 20, 2007.

Office Action of the IPO (Translation), Qualcomm Incorporated, Nov. 23, 2010.

Taiwanese Search Report—095140638—TIPO—Nov. 4, 2010.

* cited by examiner

ARITHMETIC LOGIC AND SHIFTING DEVICE FOR USE IN A PROCESSOR

BACKGROUND

I. Field

The present disclosure generally relates to a combined arithmetic logic and shifting device for use in a processor. More particularly, the disclosure relates to a load/store unit that includes an address generation unit having an arithmetic logic unit and a shifting device.

II. Description of Related Art

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can include a web interface that can be used to access the Internet. As such, these wireless telephones include significant computing capabilities.

Typically, as these devices include greater functionality, more internal components may be needed to support the various functions of the devices. Further, as the number of internal components increase, the costs associated with manufacturing the devices increases. For example, a processor within a particular device may execute a variety of computer execution instructions in order to provide the functionality associated with the particular device. Certain instructions, e.g., load/store instructions, may utilize an address generation unit in order to generate a data cache address for loading or storing data. Other instructions may be executed by an execution unit, such as a multiplier or an arithmetic logic unit.

Accordingly, it would be advantageous to provide an improved load/store unit and an enhanced address generation unit within processors.

SUMMARY

An arithmetic logic and shifting device is disclosed and includes an arithmetic logic unit that has a first input to receive a first operand from a first register, a second input to receive a second operand from a second register, and an output to selectively provide a memory address to a memory unit in a first mode of operation and to selectively provide an arithmetic output in a second mode of operation. Further, the arithmetic logic and shifting device includes a programmable shifter device that has a first input to receive data from the memory unit, a second input to receive data from the arithmetic logic unit, a third input to receive a control signal including control information including a shift amount and an operation code of a computer execution instruction, and a shifted output to provide shifted data.

In a particular embodiment, the programmable shifter device receives data from a memory unit in the first mode of operation. Further, in a particular embodiment, the programmable shifter device receives the arithmetic output from the arithmetic logic unit in the second mode of operation. In another particular embodiment, the arithmetic logic unit is selected from the group of an adder, a subtracter, a comparator, or a combination thereof.

In a particular embodiment, the programmable shifter device is a load aligner. Also, in another particular embodiment, the arithmetic logic and shifting device includes a memory unit and the memory unit includes a data cache that is coupled to the arithmetic logic unit.

In still another particular embodiment, the first operand is a base address and the second operand is an address offset value.

In a particular embodiment, the computer execution instruction is a load instruction. In another particular embodiment, the computer execution instruction is a store instruction. Further, in a particular embodiment, each input and each output is sixty four bits long.

In another embodiment, a method of processing computer execution instructions is disclosed and includes receiving a first operand associated with a computer execution instruction, receiving a second operand associated with the computer execution instruction, and performing an arithmetic operation using the first operand and the second operand to generate an arithmetic result. Additionally, the method includes receiving an operation code associated with the computer execution instruction. The operation code indicates whether to provide the arithmetic result to a memory unit or to a programmable shifter device.

In yet another embodiment, a processor device is disclosed and includes an address generation unit that has a first mode of operation and a second mode of operation. The address generation unit generates a memory address in the first mode of operation. The address generation unit executes arithmetic instructions in the second mode of operation.

In still another embodiment, a multithreaded processor device is disclosed and includes a plurality of independent program threads and an address generation unit accessible to the plurality of independent program threads. The address generation unit includes a first mode of operation in which the address generation unit can selectively generate a memory address. Moreover, the address generation unit includes a second mode of operation in which the address generation unit can execute arithmetic instructions and logical instructions.

In yet still another embodiment, a portable communication device is disclosed and includes a digital signal processor. The digital signal processor includes an address generation unit that has a first mode of operation and a second mode of operation. In the first mode of operation, the address generation unit can selectively generate a memory address. In the second mode of operation, the address generation unit can selectively execute arithmetic instructions and logical instructions.

In another embodiment, an audio file player is disclosed and includes an audio coder/decoder (CODEC) and a digital signal processor coupled to the CODEC. The digital signal processor includes an address generation unit that has a first mode of operation and a second mode of operation. The address generation unit can selectively generate a memory address in the first mode of operation and selectively execute arithmetic instructions and logical instructions in the second mode of operation.

In yet another embodiment, an address generation unit is disclosed and includes means for generating a memory address in a first mode of operation and means for performing an arithmetic operation in a second mode of operation.

In still another embodiment, an address generation unit is disclosed and includes means for receiving a first operand associated with a computer execution instruction, means for receiving a second operand associated with the computer execution instruction, means for performing an arithmetic operation using the first operand and the second operand to generate an arithmetic result, and means for receiving an operation code associated with the computer execution instruction, wherein the operation code indicates whether to provide the arithmetic result to a memory unit or to a programmable shifter device.

In another embodiment, a processor device is disclosed and includes means for receiving a first operand associated with a computer execution instruction, means for receiving a second operand associated with the computer execution instruction, means for performing an arithmetic operation using the first operand and the second operand to generate an arithmetic result, and means for receiving an operation code associated with the computer execution instruction. The operation code indicates whether to provide the arithmetic result to a memory unit or to a programmable shifter device.

An advantage of one or more embodiments disclosed herein can include using an address generation unit to generate a memory address in a first mode of operation.

Another advantage of one or more embodiments disclosed herein can include using an address generation unit to execute arithmetic instructions in a second mode of operation.

Yet another advantage of one or more embodiments disclosed herein can include using an address generation unit to execute logical instructions in a second mode of operation.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

Figure 1:
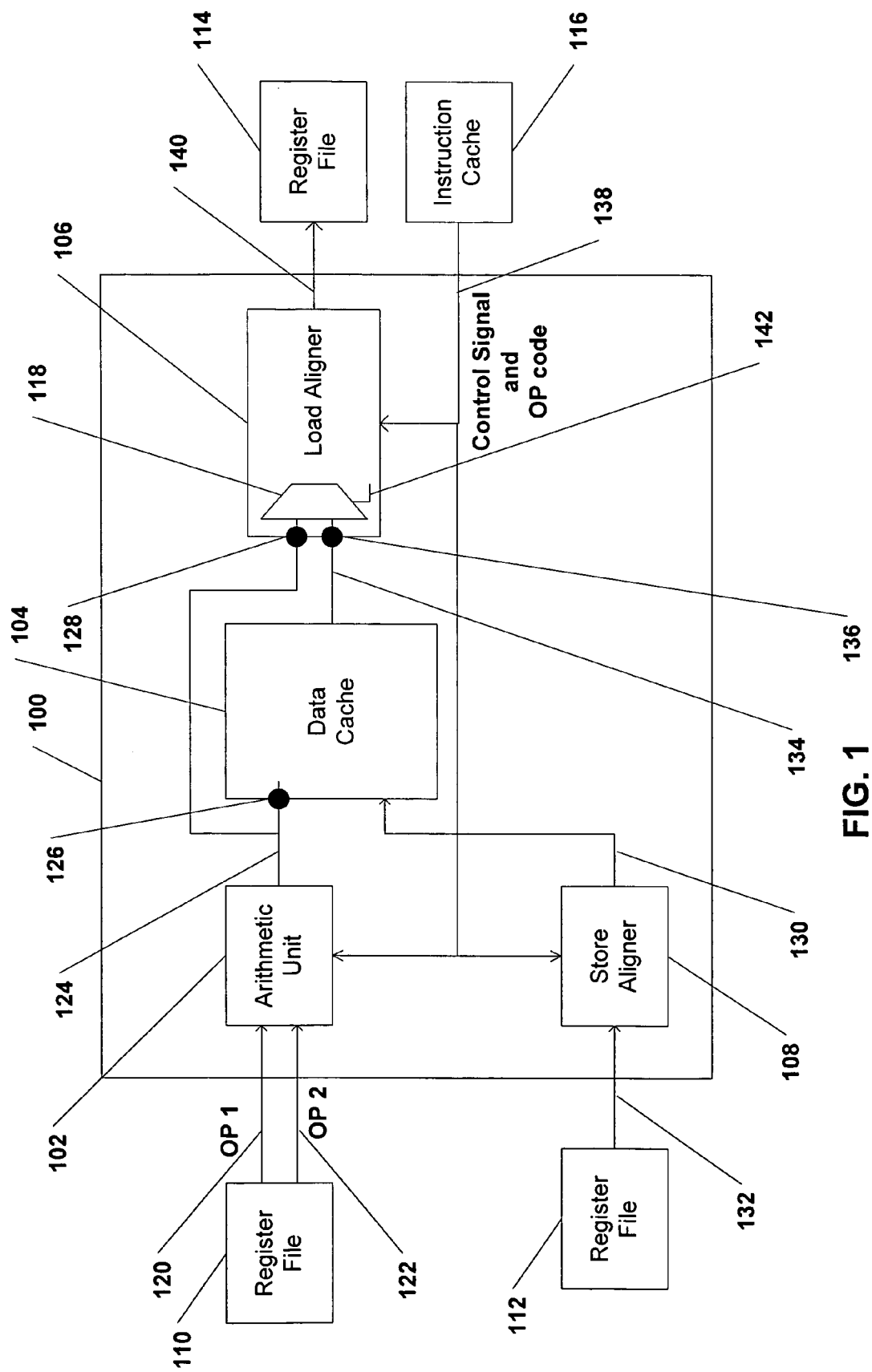
FIG. 1 is a general diagram of an exemplary address generation unit.

Referring to FIG. 1, an arithmetic logic and shifting device, e.g., an address generation unit (AGU) is shown and is generally designated 100. As depicted in FIG. 1, the AGU 100 includes an arithmetic logic unit (ALU) 102 that is coupled to a memory, e.g., a data cache 104. Further, a first programmable shifter device, e.g., a load aligner 106 is coupled to the ALU 102 and the data cache 104. FIG. 1 also shows a second programmable shifter device, e.g., a store aligner 108 that is coupled to the data cache 104. The ALU 102 and the store aligner 108 each receive a control signal 138 including an operation code. In an illustrative embodiment, the ALU 102 can be an adder, a subtracter, a comparator, or a combination thereof.

As shown in FIG. 1, a first register file read port 110 is coupled to the ALU 102. Further, a second register file read port 112 is coupled to the store aligner. A register file write port 114 and an instruction cache 116 can be coupled to the load aligner 106. Also, as indicated in FIG. 1, the load aligner 106 can include a multiplexer (MUX) 118.

In a particular embodiment, the first register file read port 110 can provide a first operand 120 and a second operand 122 to the ALU 102. Moreover, as shown in FIG. 1, the ALU 102 can output an ALU result 124 that can be selectively provided to an input 126 to the data cache 104 or a first input 128 at the load aligner 106. In another particular embodiment, the data cache 104 can receive data to be stored from the store aligner 108 based on the OP code command 138 and the store address from the ALU 102.

FIG. 1 further indicates that the data cache 104 can output load data 134 that can be selectively provided to the load aligner 106 via a second input 136 located at the load aligner 106. In an exemplary embodiment, the instruction cache 116 can provide a control signal that includes an operation (OP) code 138 and other control information to the load aligner 106. The OP code 138 can indicate a type of instruction to be executed at the AGU 100. Based on the OP code, the MUX 118 at the load aligner 106 can selectively allow either the ALU result 124 or the load data 134 to be input to the load aligner 106. The control signal 138 indicates whether the data is signed or unsigned. In an illustrative embodiment, for the load operation, the three least significant bits of the ALU result 124 indicate the shift amount needed.

In a particular embodiment, the load aligner 106 can shift, or align, the ALU result 124 or the load data 134. The amount of bits to shift can be based on the OP code 138. For example, the size can be a byte, a half word, a word, or a double word. After performing a shift operation based on the size of word indicated, the load aligner 106 can output a load aligner output 140 to the third register file write port 114. FIG. 1 further shows that the MUX 118 within the load aligner 106 can include a selector input 142. The OP code 138 can be input to the selector input 142 and instruct the MUX 118 to allow the ALU result 124 or the load data 134 to be input to the load aligner 106.

Figure 2:
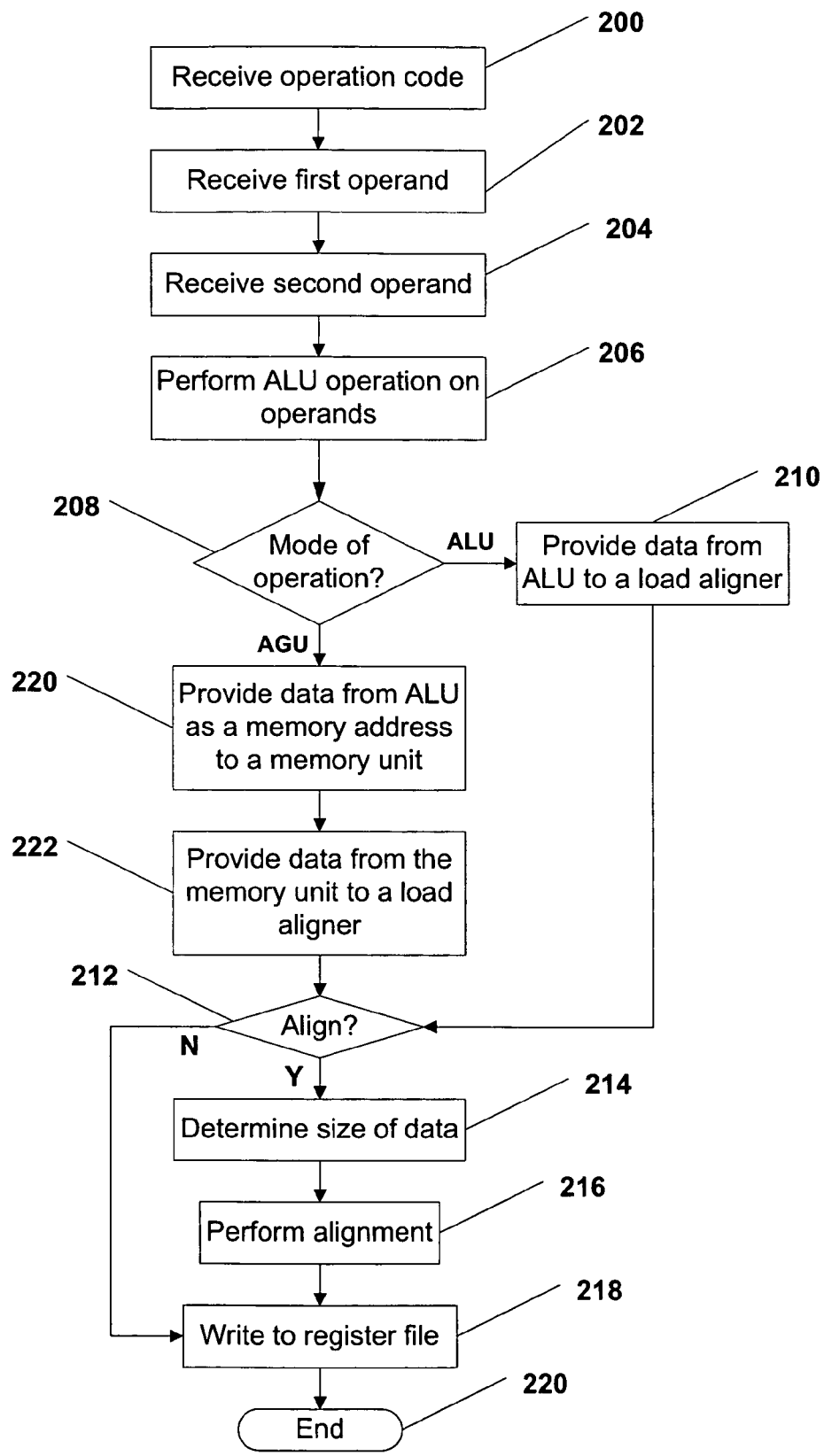
FIG. 2 is flow chart illustrating a method of executing computer instructions within an address generation unit.

FIG. 2 depicts a method of executing computer instructions using an address generation unit (AGU). At block 200, the AGU receives an operation code that defines the mode of operation associated with an instruction associated with the first operand and the second operand. In a particular embodiment, the AGU includes a first mode of operation, e.g., an AGU mode of operation, in which the AGU generates a memory address for a load instruction or a store instruction and a second mode of operation, e.g., an ALU mode of operation, in which the AGU executes arithmetic instructions and logical instructions.

At block 202, the AGU receives a first operand, e.g., from a first register file port. At block 204, the AGU receives a second operand, e.g., from a second register file port. In a particular embodiment, the first operand is a base address and the second operand is an address offset value.

Moving to block 206, the AGU performs an arithmetic operation on the operands. In an illustrative embodiment, an arithmetic logic unit (ALU) within the AGU performs the arithmetic operation on the operands. Moreover, in a particular embodiment, the arithmetic operation is an add operation or a subtract operation. In another embodiment, the ALU can perform a logic operation on the operands. For example, the ALU can perform a compare operation on the operands.

At decision step 208, the AGU determines the mode of operation. When the mode of operation is the ALU mode of operation, the method proceeds to block 210 and output data from the ALU is provided to a load aligner. Moving to decision step 212, the load aligner determines whether to align the data from the ALU. This decision is based on the size of the data, e.g., byte, half word, word, or double word and type of instruction. At block 214, the load aligner determines the size of the data. In a particular embodiment, the load aligner determines the size of the data based on the operation code. At block 216, the load aligner aligns the data based on the size and location of data. The location of the data is determined by the AGU. Proceeding to block 218, the data is written to a register file port. The method then ends at state 220.

Returning to decision step 212, if the data does not need to be aligned, the method proceeds to block 218 and the data is written to the register file port. The method then ends at state 220. In a particular embodiment, the data may not need to be aligned when the cache read port and the load read requirements are the same.

Returning to decision step 208, when the mode of operation is the AGU mode of operation, the method proceeds to block 220. At block 220, the data from the ALU is provided as a memory address to a memory unit, e.g., a data cache. Proceeding to block 222, data from the memory unit is provided to the load aligner. The method then continues to decision step 212 and continues as depicted in FIG. 2.

Figure 3:
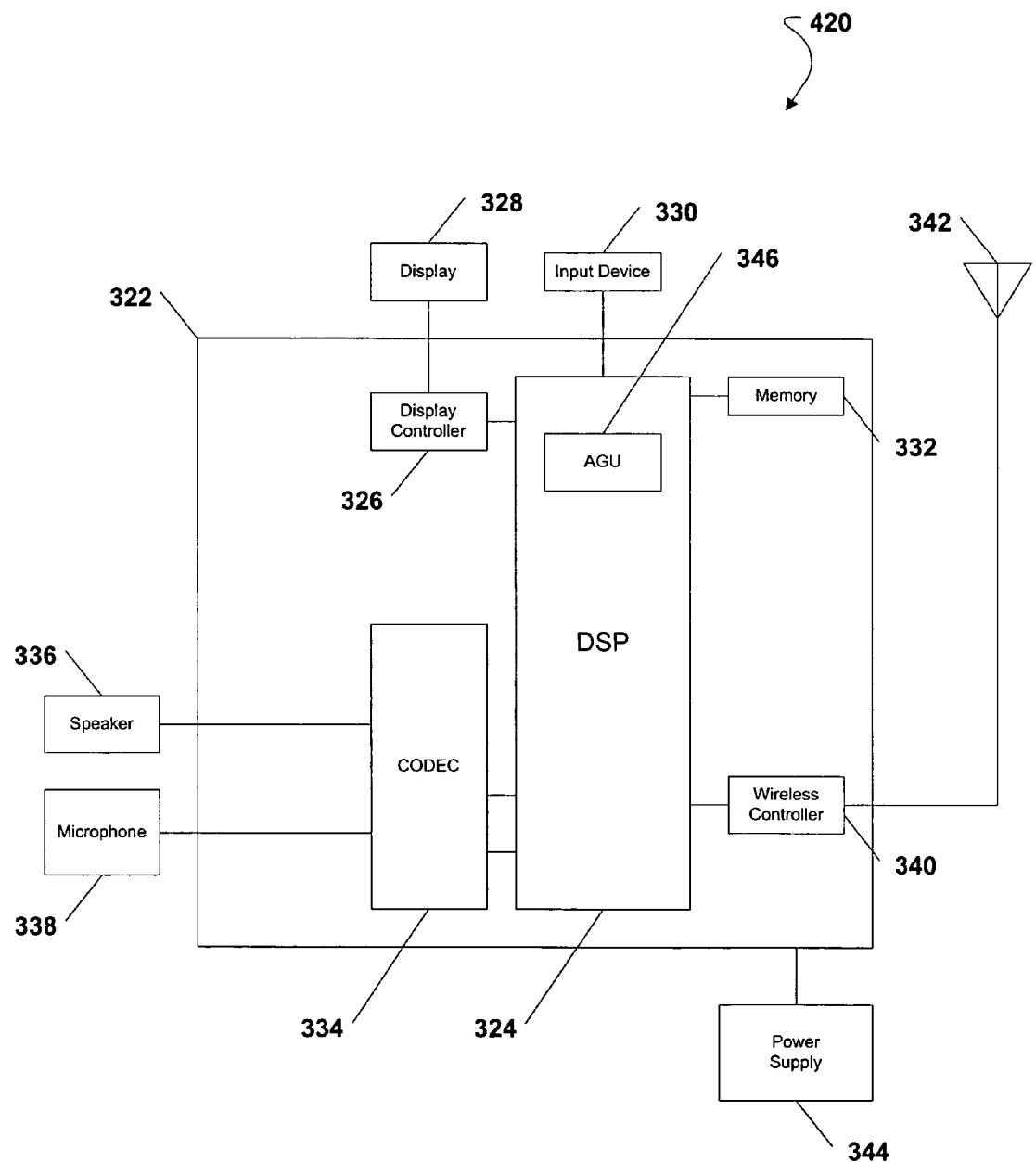
FIG. 3 is a general diagram of a portable communication device incorporating a digital signal processor.

FIG. 3 illustrates an exemplary, non-limiting embodiment of a portable communication device that is generally designated 320. As illustrated in FIG. 3, the portable communication device includes an on-chip system 322 that includes a digital signal processor 324. In a particular embodiment, the digital signal processor 324 is the digital signal processor shown in FIG. 1 and described herein. FIG. 3 also shows a display controller 326 that is coupled to the digital signal processor 324 and a display 328. Moreover, an input device 330 is coupled to the digital signal processor 324. As shown, a memory 332 is coupled to the digital signal processor 324. Additionally, a coder/decoder (CODEC) 334 can be coupled to the digital signal processor 324. A speaker 336 and a microphone 338 can be coupled to the CODEC 330.

FIG. 3 also indicates that a wireless controller 340 can be coupled to the digital signal processor 324 and a wireless antenna 342. In a particular embodiment, a power supply 344 is coupled to the on-chip system 322. Moreover, in a particular embodiment, as illustrated in FIG. 3, the display 328, the input device 330, the speaker 336, the microphone 338, the wireless antenna 342, and the power supply 344 are external to the on-chip system 322. However, each is coupled to a component of the on-chip system 322.

In a particular embodiment, the digital signal processor 324 utilizes interleaved multithreading to process instructions associated with program threads necessary to perform the functionality and operations needed by the various components of the portable communication device 320. For example, when a wireless communication session is established via the wireless antenna a user can speak into the microphone 338. Electronic signals representing the user's voice can be sent to the CODEC 334 to be encoded. The digital signal processor 324 can perform data processing for the CODEC 334 to encode the electronic signals from the microphone. Further, incoming signals received via the wireless antenna 342 can be sent to the CODEC 334 by the wireless controller 340 to be decoded and sent to the speaker 336. The digital signal processor 324 can also perform the data processing for the CODEC 334 when decoding the signal received via the wireless antenna 342.

Further, before, during, or after the wireless communication session, the digital signal processor 324 can process inputs that are received from the input device 330. For example, during the wireless communication session, a user may be using the input device 330 and the display 328 to surf the Internet via a web browser that is embedded within the memory 332 of the portable communication device 320. The digital signal processor 324 can interleave various program threads that are used by the input device 330, the display controller 326, the display 328, the CODEC 334 and the wireless controller 340, as described herein, to efficiently control the operation of the portable communication device 320 and the various components therein. Many of the instructions associated with the various program threads are executed concurrently during one or more clock cycles. As such, the power and energy consumption due to wasted clock cycles is substantially decreased.

FIG. 3 further indicates that the DSP 324 includes an address generation unit (AGU) 346. In a particular embodiment, the AGU 346 within the DSP 324 is the AGU described above in conjunction with FIG. 1.

Figure 4:
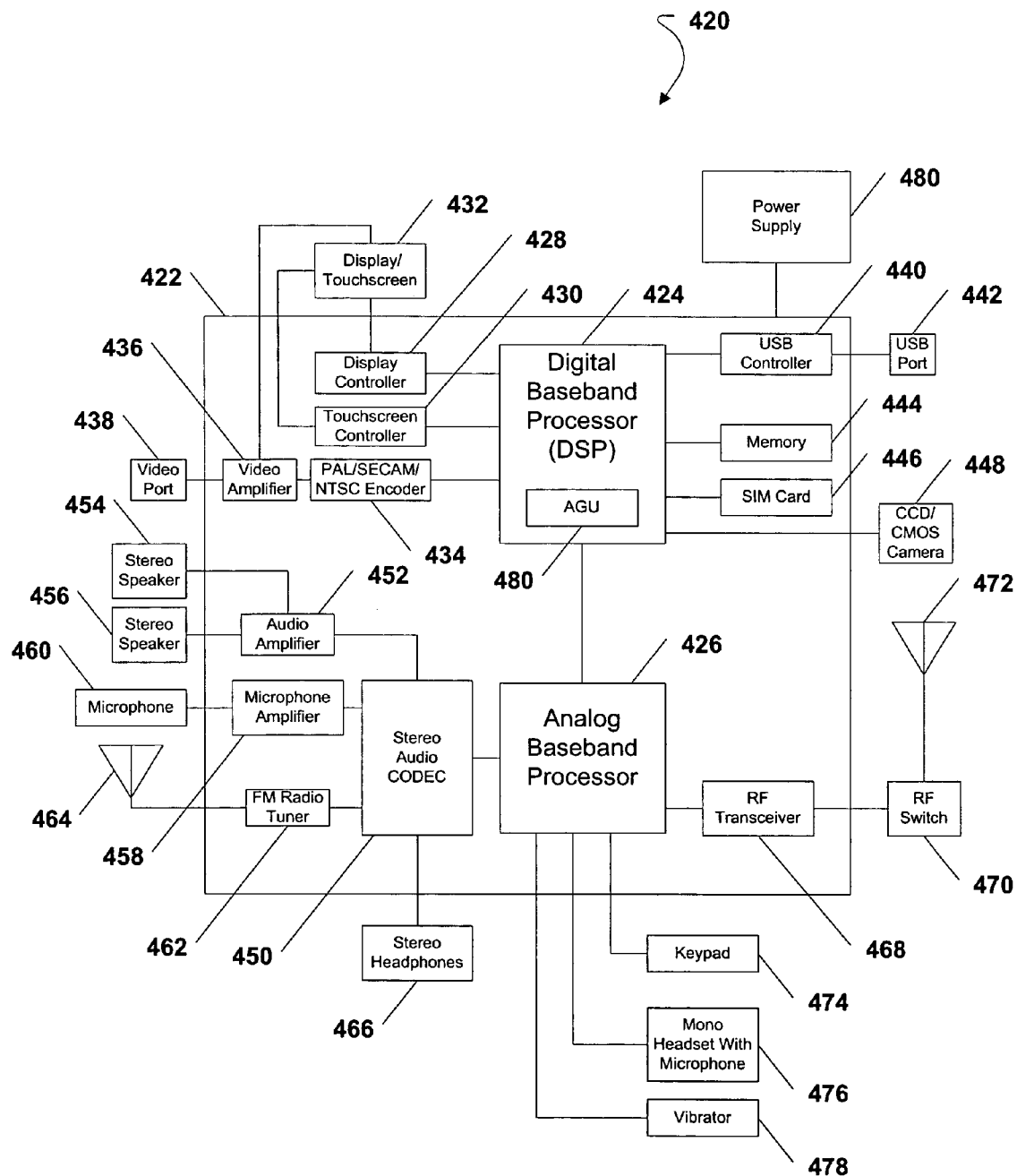
FIG. 4 is a general diagram of an exemplary cellular telephone incorporating a digital signal processor.

Referring to FIG. 4, an exemplary, non-limiting embodiment of a cellular telephone is shown and is generally designated 420. As shown, the cellular telephone 420 includes an on-chip system 422 that includes a digital baseband processor 424 and an analog baseband processor 426 that are coupled together. As illustrated in FIG. 4, a display controller 428 and a touchscreen controller 430 are coupled to the digital baseband processor 424. In turn, a touchscreen display 432 external to the on-chip system 422 is coupled to the display controller 428 and the touchscreen controller 430.

FIG. 4 further indicates that a video encoder 434, e.g., a phase alternating line (PAL) encoder, a sequential couleur a memoire (SECAM) encoder, or a national television system(s) committee (NTSC) encoder, is coupled to the digital baseband processor 424. Further, a video amplifier 436 is coupled to the video encoder 434 and the touchscreen display 432. Also, a video port 438 is coupled to the video amplifier 436. As depicted in FIG. 4, a universal serial bus (USB) controller 440 is coupled to the digital baseband processor 424. Also, a USB port 442 is coupled to the USB controller 440. A memory 444 and a subscriber identity module (SIM) card 446 can also be coupled to the digital baseband processor 424. Further, as shown in FIG. 4, a digital camera 448 can be coupled to the digital baseband processor 424. In an exemplary embodiment, the digital camera 448 is a charge-coupled device (CCD) camera or a complementary metal-oxide semiconductor (CMOS) camera.

As further illustrated in FIG. 4, a stereo audio CODEC 450 can be coupled to the analog baseband processor 426. Moreover, an audio amplifier 452 can coupled to the to the stereo audio CODEC 450. In an exemplary embodiment, a first stereo speaker 454 and a second stereo speaker 456 are coupled to the audio amplifier 452. FIG. 4 shows that a microphone amplifier 458 can be also coupled to the stereo audio CODEC 450. Additionally, a microphone 460 can be coupled to the microphone amplifier 458. In a particular embodiment, a frequency modulation (FM) radio tuner 462 can be coupled to the stereo audio CODEC 450. Also, an FM antenna 464 is coupled to the FM radio tuner 462. Further, stereo headphones 466 can be coupled to the stereo audio CODEC 450.

FIG. 4 further indicates that a radio frequency (RF) transceiver 468 can be coupled to the analog baseband processor 426. An RF switch 470 can be coupled to the RF transceiver 468 and an RF antenna 472. As shown in FIG. 4, a keypad 474 can be coupled to the analog baseband processor 426. Also, a mono headset with a microphone 476 can be coupled to the analog baseband processor 426. Further, a vibrator device 478 can be coupled to the analog baseband processor 426. FIG. 4 also shows that a power supply 480 can be coupled to the on-chip system 422. In a particular embodiment, the power supply 480 is a direct current (DC) power supply that provides power to the various components of the cellular telephone 420 that require power. Further, in a particular embodiment, the power supply is a rechargeable DC battery or a DC power supply that is derived from an alternating current (AC) to DC transformer that is connected to an AC power source.

In a particular embodiment, as depicted in FIG. 4, the touchscreen display 432, the video port 438, the USB port 442, the camera 448, the first stereo speaker 454, the second stereo speaker 456, the microphone 460, the FM antenna 464, the stereo headphones 466, the RF switch 470, the RF antenna 472, the keypad 474, the mono headset 476, the vibrator 478, and the power supply 480 are external to the on-chip system 422. Moreover, in a particular embodiment, the digital baseband processor 424 and the analog baseband processor 426 can use interleaved multithreading, described herein, in order to process the various program threads associated with one or more of the different components associated with the cellular telephone 420.

FIG. 4 further indicates that the DSP 424 includes an address generation unit (AGU) 480. In a particular embodiment, the AGU 480 within the DSP 480 is the AGU described above in conjunction with FIG. 1.

Figure 5:
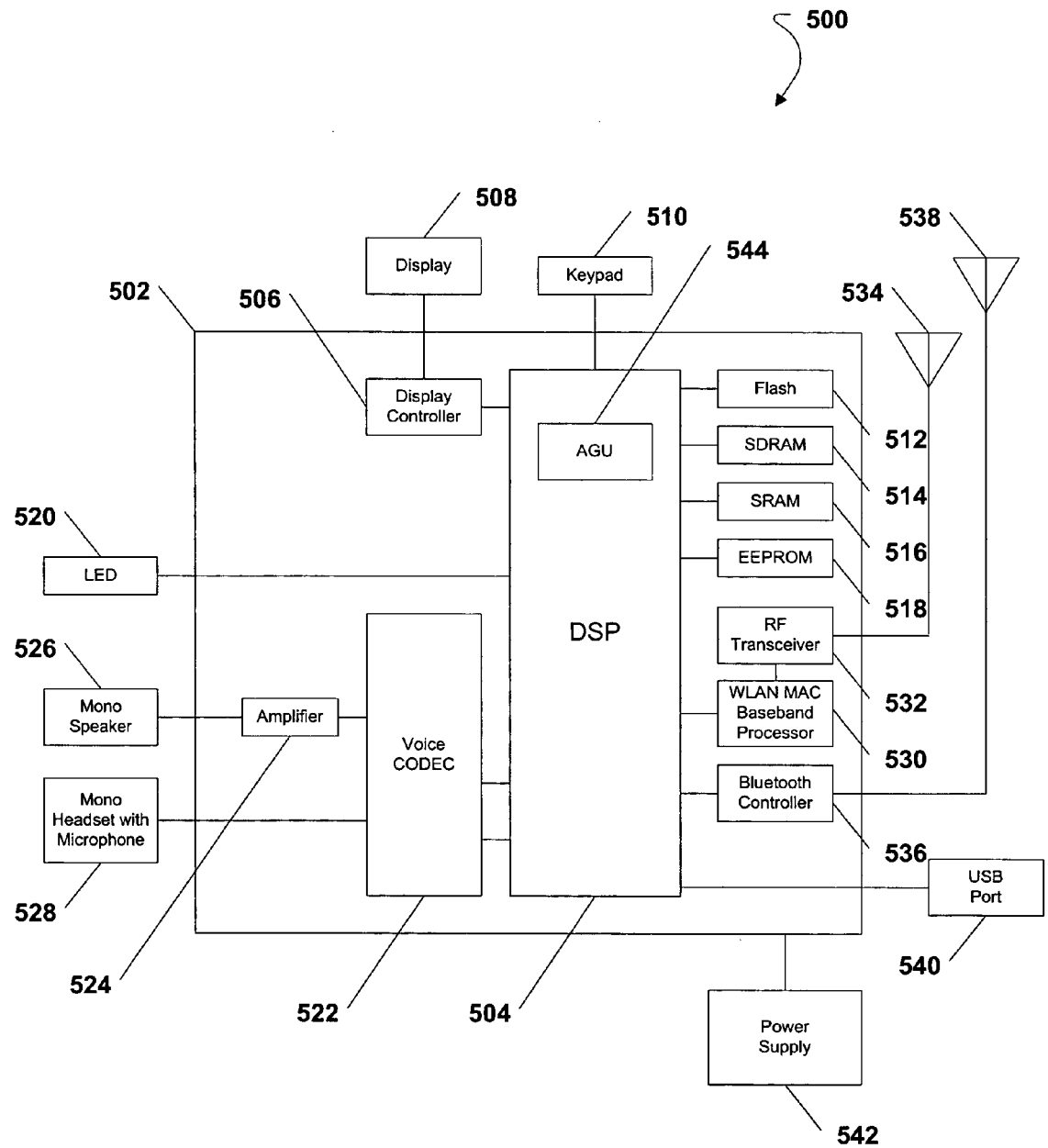
FIG. 5 is a general diagram of an exemplary wireless Internet Protocol telephone incorporating a digital signal processor.

Referring to FIG. 5, an exemplary, non-limiting embodiment of a wireless Internet protocol (IP) telephone is shown and is generally designated 500. As shown, the wireless IP telephone 500 includes an on-chip system 502 that includes a digital signal processor (DSP) 504. As illustrated in FIG. 5, a display controller 506 is coupled to the DSP 504 and a display 508 is coupled to the display controller 506. In an exemplary embodiment, the display 508 is a liquid crystal display (LCD). FIG. 5 further shows that a keypad 510 can be coupled to the DSP 504.

As further depicted in FIG. 5, a flash memory 512 can be coupled to the DSP 504. A synchronous dynamic random access memory (SDRAM) 514, a static random access memory (SRAM) 516, and an electrically erasable programmable read only memory (EEPROM) 518 can also be coupled to the DSP 504. FIG. 5 also shows that a light emitting diode (LED) 520 can be coupled to the DSP 504. Additionally, in a particular embodiment, a voice CODEC 522 can be coupled to the DSP 504. An amplifier 524 can be coupled to the voice CODEC 522 and a mono speaker 526 can be coupled to the amplifier 524. FIG. 5 further indicates that a mono headset 528 can also be coupled to the voice CODEC 522. In a particular embodiment, the mono headset 528 includes a microphone.

FIG. 5 also illustrates that a wireless local area network (WLAN) baseband processor 530 can be coupled to the DSP 504. An RF transceiver 532 can be coupled to the WLAN baseband processor 530 and an RF antenna 534 can be coupled to the RF transceiver 532. In a particular embodiment, a Bluetooth controller 536 can also be coupled to the DSP 504 and a Bluetooth antenna 538 can be coupled to the controller 536. FIG. 5 also shows that a USB port 540 can also be coupled to the DSP 504. Moreover, a power supply 542 is coupled to the on-chip system 502 and provides power to the various components of the wireless IP telephone 500 via the on-chip system 502.

In a particular embodiment, as indicated in FIG. 5, the display 508, the keypad 510, the LED 520, the mono speaker 526, the mono headset 528, the RF antenna 534, the Bluetooth antenna 538, the USB port 540, and the power supply 542 are external to the on-chip system 502. However, each of these components is coupled to one or more components of the on-chip system. Further, in a particular embodiment, the digital signal processor 504 can use interleaved multithreading, as described herein, in order to process the various program threads associated with one or more of the different components associated with the IP telephone 500.

FIG. 5 further indicates that the DSP 504 includes an address generation unit (AGU) 544. In a particular embodiment, the AGU 544 within the DSP 504 is the AGU described above in conjunction with FIG. 1.

Figure 6:
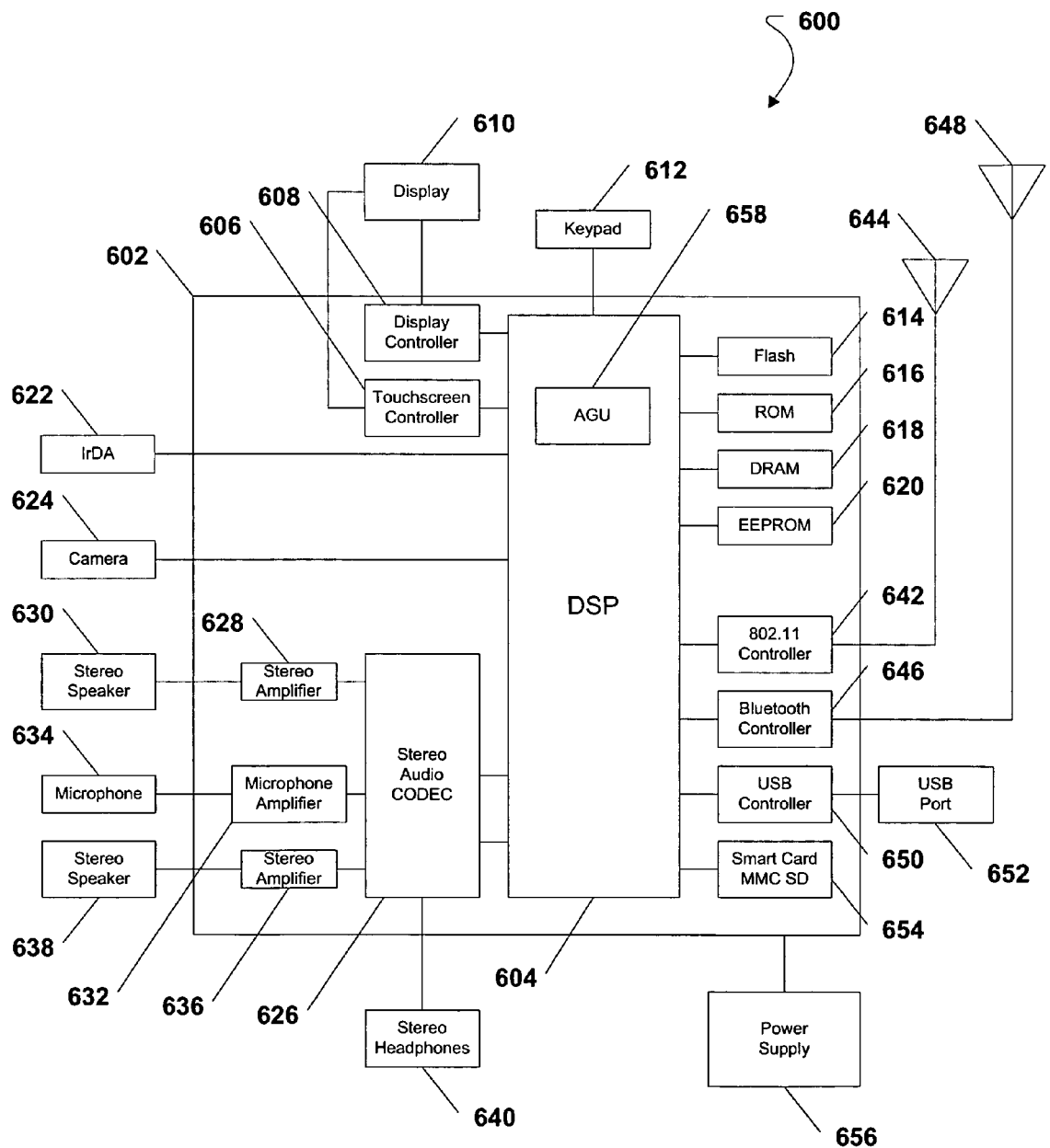
FIG. 6 is a general diagram of an exemplary portable digital assistant incorporating a digital signal processor.

FIG. 6 illustrates an exemplary, non-limiting embodiment of a portable digital assistant (PDA) that is generally designated 600. As shown, the PDA 600 includes an on-chip system 602 that includes a digital signal processor (DSP) 604. As depicted in FIG. 6, a touchscreen controller 606 and a display controller 608 are coupled to the DSP 604. Further, a touchscreen display is coupled to the touchscreen controller 606 and to the display controller 608. FIG. 6 also indicates that a keypad 612 can be coupled to the DSP 604.

As further depicted in FIG. 6, a flash memory 614 can be coupled to the DSP 604. Also, a read only memory (ROM) 616, a dynamic random access memory (DRAM) 618, and an electrically erasable programmable read only memory (EEPROM) 620 can be coupled to the DSP 604. FIG. 6 also shows that an infrared data association (IrDA) port 622 can be coupled to the DSP 604. Additionally, in a particular embodiment, a digital camera 624 can be coupled to the DSP 604.

As shown in FIG. 6, in a particular embodiment, a stereo audio CODEC 626 can be coupled to the DSP 604. A first stereo amplifier 628 can be coupled to the stereo audio CODEC 626 and a first stereo speaker 630 can be coupled to the first stereo amplifier 628. Additionally, a microphone amplifier 632 can be coupled to the stereo audio CODEC 626 and a microphone 634 can be coupled to the microphone amplifier 632. FIG. 6 further shows that a second stereo amplifier 636 can be coupled to the stereo audio CODEC 626 and a second stereo speaker 638 can be coupled to the second stereo amplifier 636. In a particular embodiment, stereo headphones 640 can also be coupled to the stereo audio CODEC 626.

FIG. 6 also illustrates that an 802.11 controller 642 can be coupled to the DSP 604 and an 802.11 antenna 644 can be coupled to the 802.11 controller 642. Moreover, a Bluetooth controller 646 can be coupled to the DSP 604 and a Bluetooth antenna 648 can be coupled to the Bluetooth controller 646. As depicted in FIG. 6, a USB controller 650 can be coupled to the DSP 604 and a USB port 652 can be coupled to the USB controller 650. Additionally, a smart card 654, e.g., a multimedia card (MMC) or a secure digital card (SD) can be coupled to the DSP 604. Further, as shown in FIG. 6, a power supply 656 can be coupled to the on-chip system 602 and can provide power to the various components of the PDA 600 via the on-chip system 602.

In a particular embodiment, as indicated in FIG. 6, the display 610, the keypad 612, the IrDA port 622, the digital camera 624, the first stereo speaker 630, the microphone 634, the second stereo speaker 638, the stereo headphones 640, the 802.11 antenna 644, the Bluetooth antenna 648, the USB port 652, and the power supply 650 are external to the on-chip system 602. However, each of these components is coupled to one or more components on the on-chip system. Additionally, in a particular embodiment, the digital signal processor 604 can use interleaved multithreading, described herein, in order to process the various program threads associated with one or more of the different components associated with the portable digital assistant 600.

FIG. 6 further indicates that the DSP 604 includes an address generation unit (AGU) 658. In a particular embodiment, the AGU 658 within the DSP 604 is the AGU described above in conjunction with FIG. 1.

Figure 7:
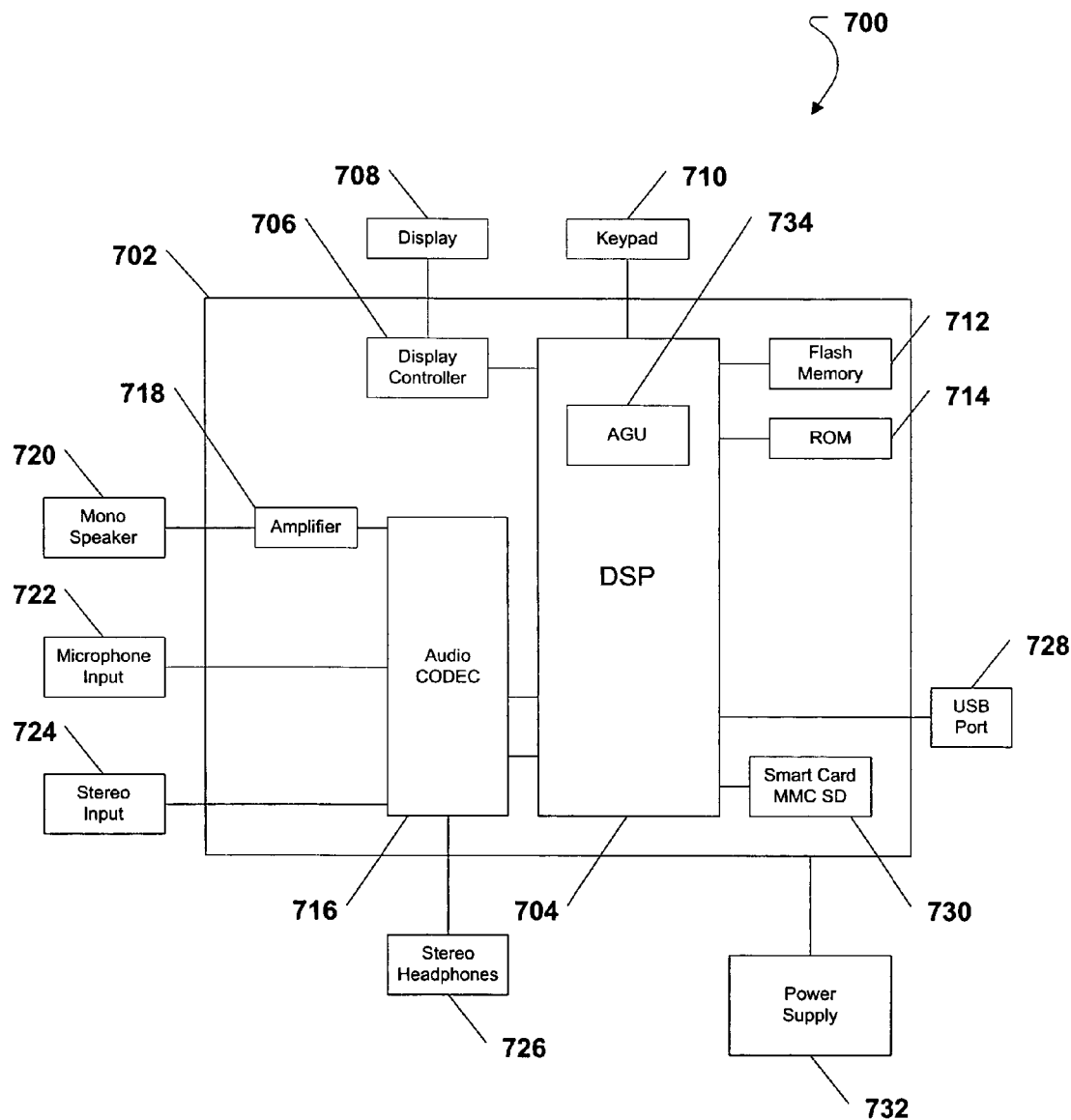
FIG. 7 is a general diagram of an exemplary audio file player incorporating a digital signal processor.

Referring to FIG. 7, an exemplary, non-limiting embodiment of an audio file player, such as moving pictures experts group audio layer-3 (MP3) player is shown and is generally designated 700. As shown, the audio file player 700 includes an on-chip system 702 that includes a digital signal processor (DSP) 704. As illustrated in FIG. 7, a display controller 706 is coupled to the DSP 704 and a display 708 is coupled to the display controller 706. In an exemplary embodiment, the display 708 is a liquid crystal display (LCD). FIG. 7 further shows that a keypad 710 can be coupled to the DSP 704.

As further depicted in FIG. 7, a flash memory 712 and a read only memory (ROM) 714 can be coupled to the DSP 704. Additionally, in a particular embodiment, an audio CODEC 716 can be coupled to the DSP 704. An amplifier 718 can be coupled to the audio CODEC 716 and a mono speaker 720 can be coupled to the amplifier 718. FIG. 7 further indicates that a microphone input 722 and a stereo input 724 can also be coupled to the audio CODEC 716. In a particular embodiment, stereo headphones 726 can also be coupled to the audio CODEC 716.

FIG. 7 also indicates that a USB port 728 and a smart card 730 can be coupled to the DSP 704. Additionally, a power supply 732 can be coupled to the on-chip system 702 and can provide power to the various components of the audio file player 700 via the on-chip system 702.

In a particular embodiment, as indicated in FIG. 7, the display 708, the keypad 710, the mono speaker 720, the microphone input 722, the stereo input 724, the stereo headphones 726, the USB port 728, and the power supply 732 are external to the on-chip system 702. However, each of these components is coupled to one or more components on the on-chip system. Also, in a particular embodiment, the digital signal processor 704 can use interleaved multithreading, described herein, in order to process the various program threads associated with one or more of the different components associated with the audio file player 700.

FIG. 7 further indicates that the DSP 704 includes an address generation unit (AGU) 734. In a particular embodiment, the AGU 734 within the DSP 704 is the AGU described above in conjunction with FIG. 1.

Figure 8:
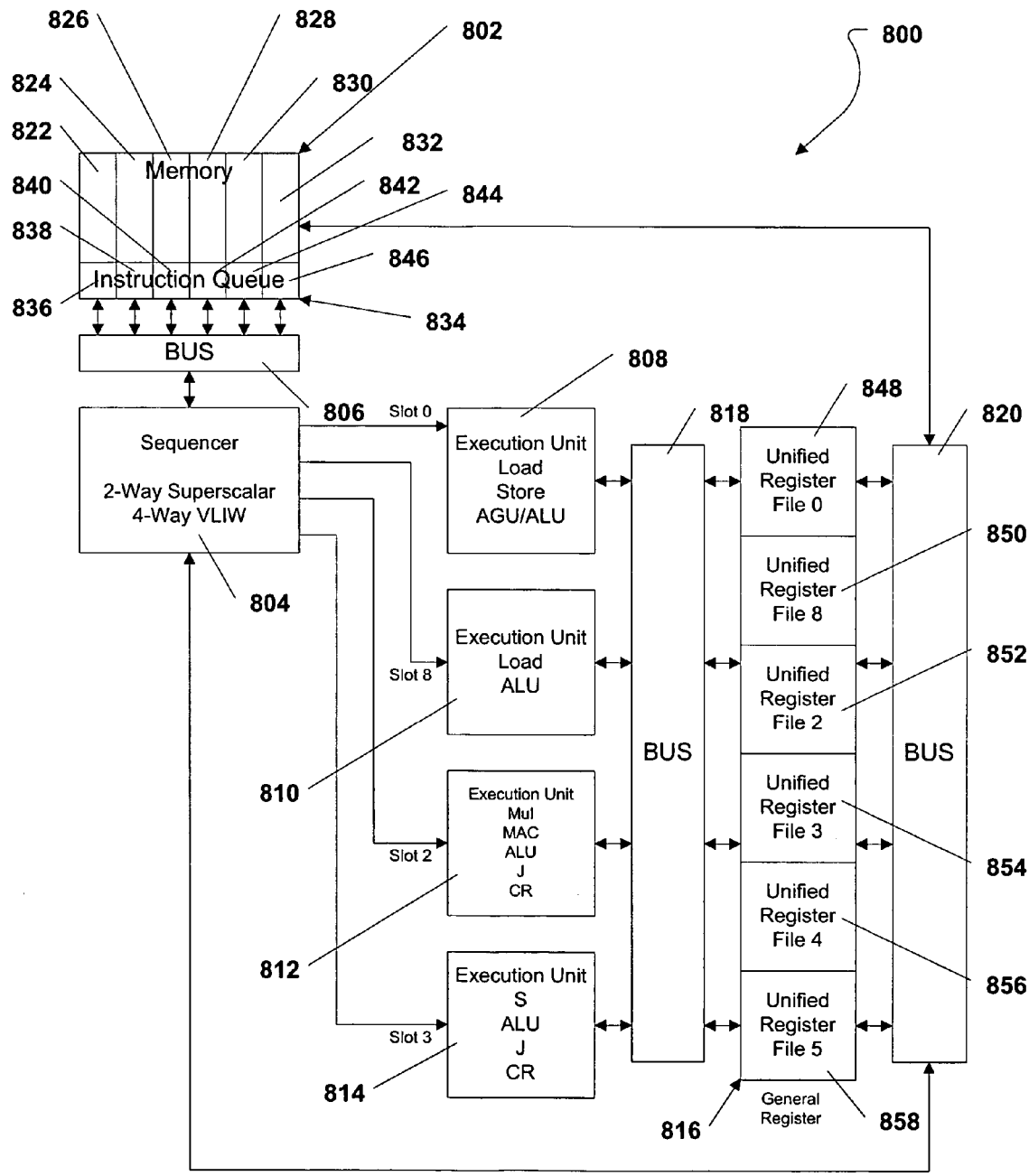
FIG. 8 is a general diagram of an exemplary digital signal processor.

FIG. 8 illustrates a block diagram of an exemplary, non-limiting embodiment of a digital signal processor (DSP) 800. As illustrated in FIG. 8, the DSP 800 includes a memory 802 that is coupled to a sequencer 804 via a bus 806. In a particular embodiment, the bus 806 is a sixty-four (64) bit bus and the sequencer 804 is configured to retrieve instructions from the memory 802 having a length of thirty-two (32) bits. The bus 806 is coupled to a first instruction execution unit 808, a second instruction execution unit 810, a third instruction execution unit 812, and a fourth instruction execution unit 814. FIG. 8 indicates that each instruction execution unit 808, 810, 812, 814 can be coupled to a general register file 816 via a first bus 818. The general register file 816 can also be coupled to the sequencer 804 and the memory 802 via a second bus 820.

In a particular embodiment, the memory 802 includes a first instruction cache 822, a second instruction cache 824, a third instruction cache 826, a fourth instruction cache 828, a fifth instruction cache 830, and a sixth instruction cache 832. During operation, the instruction caches 822, 824, 826, 828, 830, 832 can be accessed independently of each other by the sequencer 804. Additionally, in a particular embodiment, each instruction cache 822, 824, 826, 828, 830, 832 includes a plurality of instructions.

As illustrated in FIG. 8, the memory 802 can include an instruction queue 834 that includes an instruction queue coupled to each instruction cache 822, 824, 826, 828, 830, 832. In particular, the instruction queue 834 includes a first instruction queue 836 that is associated with the first instruction cache 822, a second instruction queue 838 that is associated with the second instruction cache 824, a third instruction queue 840 that is associated with the third instruction cache 826, a fourth instruction queue 842 that is associated with the fourth instruction cache 828, a fifth instruction queue 844 that is associated with the fifth instruction cache 830, and a sixth instruction queue 846 that is associated with the sixth instruction cache 832.

During operation, the sequencer 804 can fetch instructions from each instruction cache 822, 824, 826, 828, 830, 832 via the instruction queue 834. In a particular embodiment, the sequencer 804 fetches instructions from the instruction queues 836, 838, 840, 842, 844, 846 in order from the first instruction queue 836 to the sixth instruction queue 846. After fetching an instruction from the sixth instruction queue 846, the sequencer 804 returns to the first instruction queue 836 and continues fetching instructions from the instruction queues 836, 838, 840, 842, 844, 846 in order.

In a particular embodiment, the sequencer 804 operates in a first mode as a 2-way superscalar sequencer that supports superscalar instructions. Further, in a particular embodiment, the sequencer also operates in a second mode that supports very long instruction word (VLIW) instructions. In particular, the sequencer can operate as a 4-way VLIW sequencer. In a particular embodiment, the first instruction execution unit 808 can execute a load instruction, a store instruction, and an arithmetic logic unit (ALU) instruction. Further, the first instruction execution unit 808 can include the AGU described above in conjunction with FIG. 1. The second instruction execution unit 810 can execute a load instruction and an ALU instruction. Also, the third instruction execution unit can execute a multiply instruction, a multiply-accumulate instruction (MAC), an ALU instruction, a program redirect construct, and a transfer register (CR) instruction. FIG. 8 further indicates that the fourth instruction execution unit 814 can execute a shift (S) instruction, an ALU instruction, a program redirect construct, and a CR instruction. In a particular embodiment, the program redirect construct can be a zero overhead loop, a branch instruction, a jump (J) instruction, etc.

As depicted in FIG. 8, the general register 816 includes a first unified register file 848, a second unified register file 850, a third unified register file 852, a fourth unified register file 854, a fifth unified register file 856, and a sixth unified register file 858. Each unified register file 848, 850, 852, 854, 856, 858 corresponds to an instruction cache 822, 824, 826, 828, 830, 832 within the memory 802. Further, in a particular embodiment, each unified register file 848, 850, 852, 854, 856, 858 has the same construction and includes a number of data operands and a number of address operands.

During operation of the digital signal processor 800, instructions are fetched from the memory 802 by the sequencer 804 and operands are fetched from the register files 848, 850, 852, 854, 856, 858. Further, instructions and operands are sent to designated instruction execution units 808, 810, 812, 814, and executed at the instruction execution unit 808, 810, 812, 814. Further, one or more operands are retrieved from the general register 816, e.g., one of the unified register files 848, 850, 852, 854, 856, 858 and used during the execution of the instructions. The results at each instruction execution unit 808, 810, 812, 814 can be written to the general register 816, i.e., to one of the unified register files 848, 850, 852, 854, 856, 858.

With the configuration of structure disclosed herein, the register files for a digital processor operating in an interleaved multi-threaded environment provide a plurality of register files that have four data read ports and three data write ports each. Each register file includes data operands and address operands and each register file can be used to support a particular program thread. During operation, a particular instruction may access up to six operands via the four data read ports. For example, four operands may be retrieved during one clock cycle and two operands may be retrieved during a subsequent clock cycle. The use of only four data read ports substantially reduces the size of the memory required by the digital signal processor. As such, costs associated with manufacturing digital signal processor that include the register files disclosed herein are substantially reduced. Further, power consumption of a power source that is coupled to the digital signal processor is substantially reduced.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A system, comprising:
a first data path comprising an arithmetic logic unit, a data cache, a multiplexer, and a programmable shifter device;
a second data path comprising the arithmetic logic unit, the multiplexer, and the programmable shifter device;
wherein in an address generation mode, data flows from the arithmetic logic unit through the data cache, the multiplexer, and the programmable shifter device to a register file via the first data path;
wherein in an arithmetic mode, data flows from the arithmetic logic unit through the multiplexer and the programmable shifter device to the register file via the second data path in response to a common control signal provided from an instruction cache to the arithmetic logic unit, the multiplexer, and the programmable shifter device;
wherein the multiplexer has a first multiplexer input to receive an arithmetic output from the arithmetic logic unit, a second multiplexer input to receive data from the data cache, and a control multiplexer input to receive the common control signal; and
wherein the arithmetic output received in the arithmetic mode includes data resulting from an arithmetic operation performed by the arithmetic logic unit and bits that indicate an amount the resulting arithmetic operation data is to be shifted by the programmable shifter device.

2. The system of claim 1, wherein the first data path is loop-free.

3. The system of claim 1, wherein the arithmetic logic unit is selected from the group of a subtracter, an adder, a comparator, or a combination thereof.

4. The system of claim 1, wherein the programmable shifter device is a load aligner.

5. The system of claim 1, wherein the arithmetic logic unit receives a first operand and a second operand, wherein the first operand is a base address and the second operand is an address offset value.

6. The system of claim 1, wherein the programmable shifter device receives and processes the arithmetic output from the arithmetic logic unit in the arithmetic mode.

7. The system of claim 1, wherein a size of the arithmetic output is one of a byte, a half word, a full word, or a double word.

8. The system of claim 1, wherein the arithmetic output is sixty four bits long.

9. The system of claim 1, wherein the bits are a set of three least significant bits within the arithmetic output.

10. The system of claim 1, wherein the common control signal includes an operation code of a computer execution load instruction.

11. The system of claim 1, wherein the common control signal includes an operation code of a computer execution store instruction.

12. The system of claim 1, further comprising wherein the first data path and the second data path are included in a multithreaded processor configured to execute a plurality of independent program threads.

13. The system of claim 1, wherein the system is an audio file player and further comprises an audio coder/decoder (CODEC), a digital signal processor coupled to the CODEC, and a multimedia card coupled to a digital signal processor.

14. The system of claim 1, further comprising an address generation unit that includes the first data path and the second data path, wherein the instruction cache is external to the address generation unit.

15. The system of claim 1, wherein the programmable shifter device includes the multiplexer.

16. The system of claim 1, wherein the first data path and the second data path share a single multiplexer.

17. A method, comprising:
- transmitting data via a first data path in an address generation mode, wherein the first data path comprises an arithmetic logic unit, a data cache, a multiplexer, and a programmable shifter device, wherein in the address generation mode, data flows from the arithmetic logic unit through the data cache, the multiplexer, and the programmable shifter device to a register file via the first data path, and the multiplexer receives data retrieved from the data cache at a first multiplexer input in response to receiving an address generated by the arithmetic logic unit; and
- transmitting data via a second data path in an arithmetic mode, wherein the second data path comprises the arithmetic logic unit, the multiplexer, and the programmable shifter device, wherein in the arithmetic mode, data flows from the arithmetic logic unit through the multiplexer and the programmable shifter device to the register file via the second data path in response to a common control signal provided from an instruction cache to the arithmetic logic unit, the multiplexer, and the programmable shifter device, and the multiplexer receives an arithmetic output generated by the arithmetic logic device at a second multiplexer input;
- wherein the multiplexer has a control multiplexer input to receive the common control signal; and
- wherein the arithmetic output received in the arithmetic mode includes data resulting from an arithmetic operation performed by the arithmetic logic unit and bits that indicate an amount the resulting arithmetic operation data is to be shifted by the programmable shifter device.

18. The method of claim 17, further comprising receiving the retrieved cache data at the programmable shifter device in the address generation mode.

* * * * *